United States Patent [19]

Pollner et al.

[11] Patent Number: 4,911,603

[45] Date of Patent: Mar. 27, 1990

[54] AIRCRAFT TOWING VEHICLE HAVING SWIVELED NOSE WHEEL LIFTER

[75] Inventors: Juergen Pollner, Munich; Gregor Trummer, Aschering; Peter Moelzer, Schawbhausen, all of Fed. Rep. of Germany

[73] Assignee: Krauss Maffei AG, Munich, Fed. Rep. of Germany

[21] Appl. No.: 250,276

[22] Filed: Sep. 28, 1988

[30] Foreign Application Priority Data

Sep. 28, 1987 [DE] Fed. Rep. of Germany ....... 3732663

[51] Int. Cl.$^4$ .................... B60P 3/11; B62D 49/02; B64F 1/22
[52] U.S. Cl. .................................. 414/428; 414/429
[58] Field of Search .............................. 414/426–430, 414/458, 459

[56] References Cited

U.S. PATENT DOCUMENTS

| | | | |
|---|---|---|---|
| 3,049,253 | 8/1962 | Cabral | 414/428 |
| 3,586,187 | 6/1971 | Wright | 414/428 |
| 4,375,244 | 3/1983 | Morin | 414/429 X |
| 4,632,625 | 12/1986 | Schuller et al. | 414/429 |
| 4,810,157 | 3/1989 | Schopf | 414/429 |

FOREIGN PATENT DOCUMENTS

| | | |
|---|---|---|
| 0126386 | 8/1987 | European Pat. Off. . |
| 0153378 | 11/1987 | European Pat. Off. . |
| 3327628 | 2/1985 | Fed. Rep. of Germany . |
| 3534045 | 4/1987 | Fed. Rep. of Germany . |
| 1334800 | 10/1973 | United Kingdom . |

OTHER PUBLICATIONS

Interavia 9, p. 987, publ. 1987.
Transport und Lager, No. 9, pp. 68–69, publ. 1987.
Latauto Omnibus, No. 12, pp. 40–41, publ. 1985.

*Primary Examiner*—David A. Bucci
*Attorney, Agent, or Firm*—Townsend & Townsend

[57] ABSTRACT

An aircraft towing vehicle has a rearwardly opening recess adapted to receive the nose wheel of an aircraft to be towed. A nose wheel lifting and clamping mechanism has two nose wheel lifters which can be pivoted from a retracted position, in which they are parallel to sides of the vehicle frame, into an operative position, in which they extend into the recess for engaging the aircraft nose wheel. The lifters pivot on rocker arms which themselves pivot about a horizontal axis and are power driven by hydraulic actuators. A separate hydraulic swivel drive motor is provided for each lifter. The pressure increase which takes place when the swivel drive reaches the end of its path is used to initiate the delivery of pressurized fluid to the actuator. A crank arm driven by the hydraulic motor is connected to the support for the lifter with a low back pivot, self locking linkage to positively prevent even excessive forces generated during the nose wheel lifting process from unintentionally moving the lifters towards their retracted positions.

8 Claims, 5 Drawing Sheets

AIRCRAFT TOWING VEHICLE HAVING SWIVELED NOSE WHEEL LIFTER

The invention relates to aircraft towing vehicles or the kind having a vehicle frame with a generally U-shaped, rearwardly open recess that is formed to receive an aircraft nose wheel therein for clamping it to the frame.

BACKGROUND OF THE INVENTION

An aircraft towing vehicle of this general kind is disclosed in German patent publication DE-OS No. 33 27 628. It has a hydraulic actuator which engages a nose wheel lifter eccentrically relative to a swivel axis for the lifter. During a first phase of an extending stroke it causes the lifter to swing out from its retracted into its operative position. Subsequently, it pivotally moves a rocker in order to advance the extended lifter against the nose-wheel. This requires, however, that the rockers be prevented from rotating until the lifter has been fully swung out and secured in that position by means of a suitable locking mechanism. Only then may the rocker be released.

During the decoupling of the nose wheel from the towing vehicle and after the rocker has reached the end of its return path, this locking mechanism must be released so that the hydraulic actuator, during the final phase of its return stroke, can swivel the lifter back into the retracted position. The activation or release of such locking mechanisms at specific times, that is, at predetermined location along the movement paths of the various components, involves additional efforts and expense and is susceptible to mechanical breakdown. This compromises the operational reliability of the entire mechanism and, therefore, the entire towing vehicle leaves something to be desired.

SUMMARY OF THE INVENTION

An object of the invention is to develop, for aircraft towing vehicles of the type generally described above, a lifting mechanism which positively sequences and controls the swiveling and clamping or force applying movements of a lifter for the aircraft nose wheel in a simple, safe and efficient manner.

Generally speaking, the present invention provides a lifting mechanism formed by two cooperating lifters, one each mounted to the inside of the rearwardly extending frame members and pivotable into and out of engagement with the nose wheels of an aircraft to be coupled to the towing vehicle. The lifting mechanism for each lifter comprises a rocker arm that is pivotable about a horizontal shaft projecting inwardly from the associated frame member, and a lifter support, mounted to the rocker arm, that is pivotable about a generally vertical axis. The lifter support in turn preferably tiltably mounts the lifter so that it can pivot about a horizontal axis to facilitate its orientation and adaptation relative to differently sized nose wheels that must be engaged.

A hydraulic motor mounted to the rocker arm pivots the lifter support about the vertical axis between a retracted position, in which the lifting mechanism is proximate and substantially parallel to the inside of the vehicle frame member and an operative position, in which the lifting mechanism extends transversely from the frame member into the recess in which the nose wheel is located. A four point control linkage transmits rotational movement of the motor to the rocker arm. It includes an over-center arrangement to mechanically lock the lifter in its operative position so that forces acting on it during the engagement of the aircraft nose wheel cannot move the lifter back towards its retracted position.

The lifting mechanism of the present invention further includes a hydraulic actuator having one end pivotally attached to the associated frame member and another end, e.g. the reciprocating piston rod pivotally attached to the rocker arm for pivotally moving the rocker arm, and therewith the lifter, when it is in its operative position, about the horizontal axis in a forward direction. During this movement, the lifter engages an aft portion of the nose wheel and then pushes the nose wheel on to and up a ramp mounted to the vehicle, thereby raising it above ground where it is firmly clamped to the vehicle with the lifter and, preferably, with a cooperating holder that engages the nose wheel generally diametrically opposite from the lifter.

The lifting mechanism of the present invention further includes hydraulic controls for sequentially activating the hydraulic motor, to pivot the lifter between its retracted and operative positions, and the hydraulic cylinder, to advance the lifter forwardly into engagement with the nose wheel during the nose wheel engaging operation and to retract the lifter generally rearwardly during the nose wheel disengaging operation after the aircraft has been towed to the desired location. In accordance with the present invention the sequential activation of the hydraulic motor and actuator is achieved by employing suitable valving, including pressure activated valves, which energize the hydraulic actuator in response to a pressure increase in the hydraulic fluid flowing to the hydraulic motor when the nose wheel has reached its raised towing position.

A particular advantage of the present invention is that the mechanical lock for the lifter in its operative position is achieved without the need for activating separate locking mechanisms. Instead, it is accomplished by appropriately dimensioning the four point control and drive linkage coupled with the hydraulic motor in combination with an appropriate dimensioning and shaping of the lifter support so that the latter forms over-center stop surfaces for the linkage which are automatically engaged by a linkage member once the lifter is in its operative position.

DESCRIPTION OF THE PREFERRED EMBODIMENTS

Figure 1:
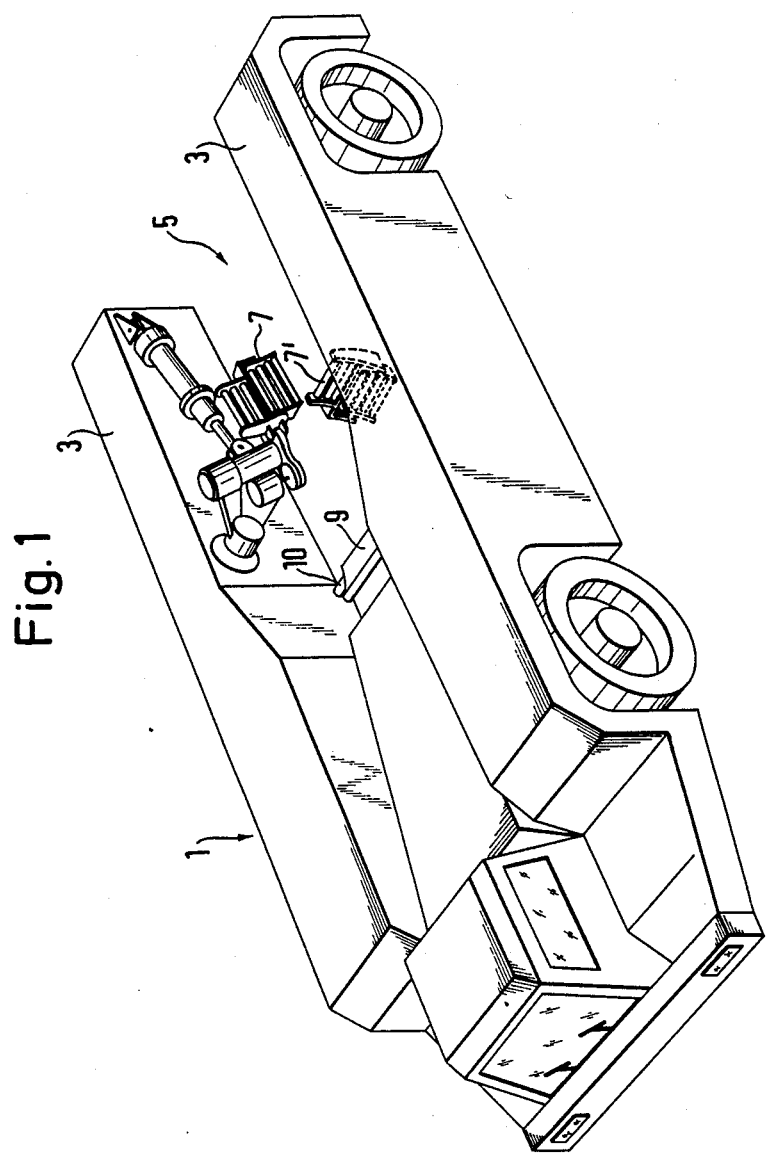
FIG. 1 is a schematic, perspective view of an aircraft towing vehicle constructed in accordance with the present invention.

A towing vehicle 1 constructed in accordance with the invention is schematically shown in FIG. 1 and has a fork-shaped frame or chassis including opposing frame sides or member 3 which form a rearwardly (to the right as seen in FIG. 1) open recess 5. In use the vehicle is maneuvered backwards towards an aircraft (not shown) to be towed so that the aircraft's nose wheel (not shown) enters recess 5. Thereafter, a pair of clamp shaped lifters 7 engage the aircraft's nose wheels from behind, i.e., they engage aft portions of the wheels. As a result of a forward movement of the lifters (accompanied by a corresponding backward movement of the towing vehicle), the wheels are raised by moving them onto and up a ramp 9 of the vehicle, until they are in their raised towing positions. A holder (not shown in FIG. 1 for simplicity's sake) engages the nose wheels from above and cooperates with the lifters to clamp the wheels with a predetermined force to the towing vehicle so that they cannot work themselves loose, thereby maintaining a firm connection between the aircraft and the vehicle. The towing vehicle 1 and the aircraft thus form a very stable towing unit so that the aircraft can be maneuvered with greater safety and, above all, at a higher speed than was possible with towing vehicles hereto in use which, typically, are connected to the aircraft with a draw bar.

To enable the nose gear undercarriage of an aircraft to enter the recess 5 of the towing vehicle, the lifters 7 must be pivoted into their retracted positions against the inner side of the respective frame members 3. Subsequently, the lifters must be pivoted or swiveled out into their operative positions to engage the nose wheels from behind. In FIG. 1, one lifter 7 is shown in the retracted position while the other one is shown in its operation position 7'. Hydraulic drives, which will be described hereinafter in greater detail, induce and control these movements of the lifters.

The nose wheel lifting mechanism and its hydraulic drives must conform to specific requirements and conditions to assure both the safety and operability of the vehicle in the environment of todays airports. An initial consideration is that the lifting mechanism, in its retracted state, may only take up a very limited space in the transverse direction of the nose wheel receiving recess 5 of the towing vehicle. The unobstructed interior clearance of the recess must be sufficient to accommodate the nose wheel undercarriages of even the largest of passenger aircraft currently in service (e.g., Boeing B 747s), which require a lateral clearance of up to 1.60 m. On the other hand, the overall width of the towing vehicle is limited by an airport's existing roadways, thoroughfares, etc. and, for practical purposes, it cannot exceed 4.20 m. That leaves, therefore, a maximum width of 1.3 m for each side of the towing vehicle which must be apportioned between the frame members, the lifting mechanism, the space required for each rear wheel, including its mounting and, if necessary, the steering mechanism. These considerations leave a maximum width of approximately 0.3–0.4 m for the lifting mechanism proper when it is in its retracted position. Despite the limited space available, the lifting mechanism must, of necessity, be sufficiently robust and large to be able to generate the substantial force that is required to raise the nose wheel, together with that portion of the weight of the aircraft brought to bear thereon.

A further consideration is that the movements of the lifting mechanism should not be controlled with complicated electronic controls requiring electronic position indicators, sensors, transducers or the like. The rough working conditions encountered at airports and the substantial interference resulting from powerful electronic radiation and signals common in today's airport environments render such electronic devices susceptible to malfunction. The lifting mechanism of the present invention takes these criteria into consideration and renders aircraft towing vehicles of the type discussed above safe, effective and efficient.

Figure 2:
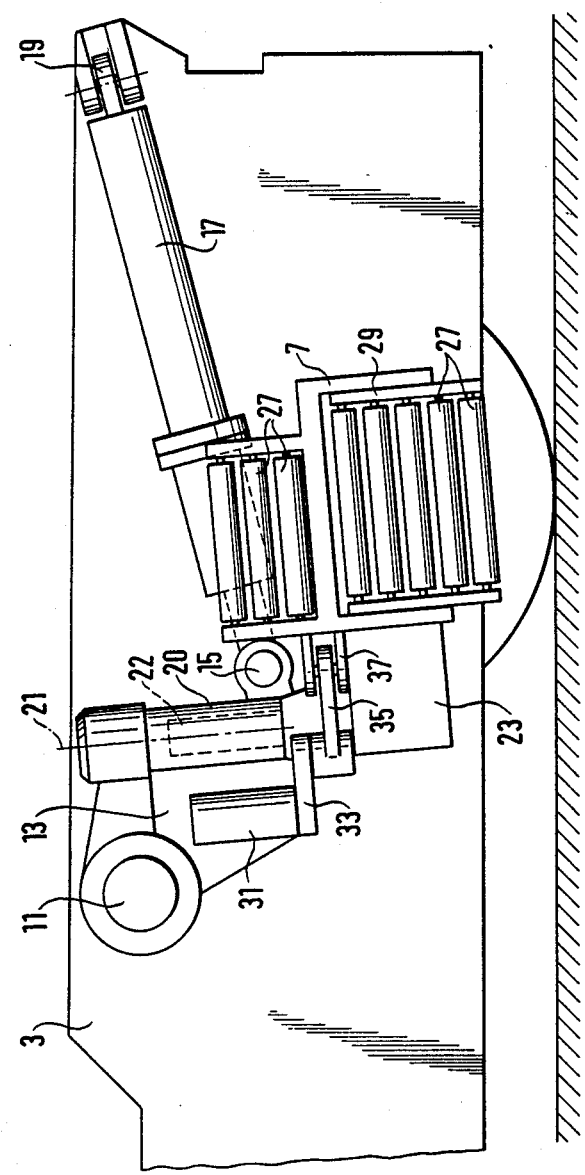
FIG. 2 is fragmentary, side elevational, detailed view of the nose wheel lifting mechanism of the present invention in its retracted position.

FIG. 2 shows lifter 7 of the lifting mechanism in the retracted position. A rocker arm 13 is mounted to frame member 3 of the towing vehicle with a bearing 11 having a horizontal axis. The piston rod of a hydraulic actuator 17 engages the rocker 13 at a hinge 15. The end of cylinder is pivotally secured to frame member 3 of the vehicle frame at 19. A shaft 22 is pivotable in a sleeve bearing 20 which forms part of the rocker arm. Shaft 22 is part of a support 23 for lifter 7 and can pivot relative to the rocker arm about an approximately vertical axis 21 (in FIG. 2, the axis is shown slightly inclined in a forward direction). Lifter 7 is configured as a roller block, having a number of parallel rollers 27, with the lower five rollers being mounted on a frame 29 which is pivotally attached to lifter 7. In this way, the lower portion of lifter 7 can adjust itself to the different sizes of aircraft nose-wheel that must be engaged.

Furthermore, the entire lifter is preferably tiltable relative to support 23 about an axis 36 which is perpendicular to the axis 21. By providing suitable control linkage (not shown), the lifter can be tilted while rocker arm 13 is pivoted in a forward direction to initially engage a lower portion of the nose wheel which facilitates the necessary lifting of the wheel onto the ramp and into its raised (above ground) towing position.

Support 23 and the associated lifter 7 are pivoted about the vertical axis 21 by a hydraulic motor 31 which is mounted to rocker arm 13 and has an axis of rotation parallel to axis 21. A crank arm 33 rotates with the shaft of hydraulic motor 31. One end of a push bar 35 is pivotally connected to the crank arm and the other end is pivotally connected to a swivel arm 37 that projects from lifter support 23. As can best be seen in the upper portion of FIG. 4, a four-point drive linkage is thereby formed between the relatively stationary axis of the hydraulic motor 31, the pivot axis 34 between crank arm 33 and push bar 35, the pivot axis 36 between push bar 35 and swivel arm 37 and, finally, the vertical axis 21 of sleeve bearing 20.

Figure 4:
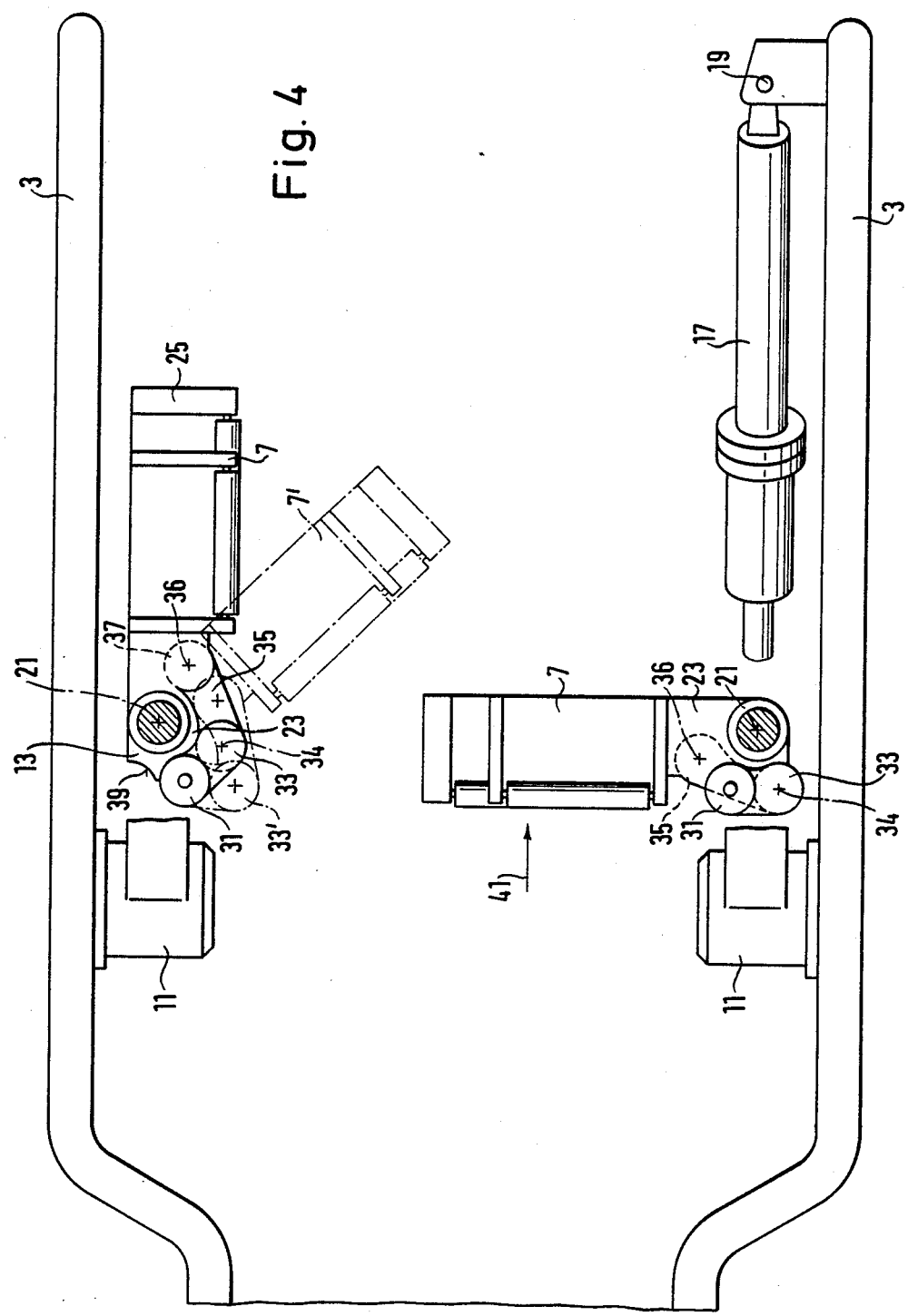
FIG. 4 is a fragmentary plan view of the towing vehicle, partially in section, and shows the lifting mechanism in different positions.

In the retracted position 25 of the lifter, as shown in the upper portion of FIG. 4, the crank arm 33 bears against the side of lifter support 23. This forms a stop beyond which the crank arm cannot be rotated (in a counter-clockwise direction, as viewed in FIG. 4) and thereby defines the retracted position of lifter 7. Thus, further, counter-clockwise rotation of the crank arm beyond the retracted position is not possible. If hydraulic motor 31 is appropriately charged with pressurized hydraulic medium, it will rotate crank arm 33 in a clockwise direction, as shown in the upper half of FIG. 4, to thereby move the lifter from its retracted towards its operative position. In the course of this movement it assumes, for example, the intermediate position indicated by dotted and dashed lines in FIG. 4. In this intermediate position the crank arm has moved to 33' and the lifter to 7'. Motor 31 continues to rotate crank arm 33 in a clockwise direction through an arc of more than 180° until the crank arm engages a detent or stop surface 39 on rocker arm 13. This position of crank arm 33 is shown in the lower part of FIG. 4. During this rotational movement of the crank arm push bar 35 has pivoted the lifter support 23 with lifter 7 into their fully swung out, operational position at which they are substantially perpendicular to the lateral frame members 3 of the towing vehicle.

The angle formed by the longitudinal axes of crank arm 33 and push bar 35, which decreases during the initial phase of the pivoting process, becomes zero before the crank arm has reached stop surface 39. During the remainder of the pivoting movement the longitudinal axis of the push bar 35 passes over or crosses the longitudinal axis of the crank arm 33; for example, it shifts from one side to the other. Consequently, in its operative position (shown in the lower portion of FIG. 4) lifter 7 is mechanically locked in place and cannot pivot back towards its retracted position when a force acting in the direction of arrow 41 is applied to it. Such a force is exerted on the lifter when it engages the nose wheel of an aircraft from behind to push it onto and up ramp 9. The return of the lifter to its retracted position is not possible because the torque generated by such a force is transmitted via push bar 35 to crank arm 33 and urges the latter against stop surface 39. Additionally the inside of the push bar can be shaped so that it continuously bears against the side of lifter support 23.

Figure 5:
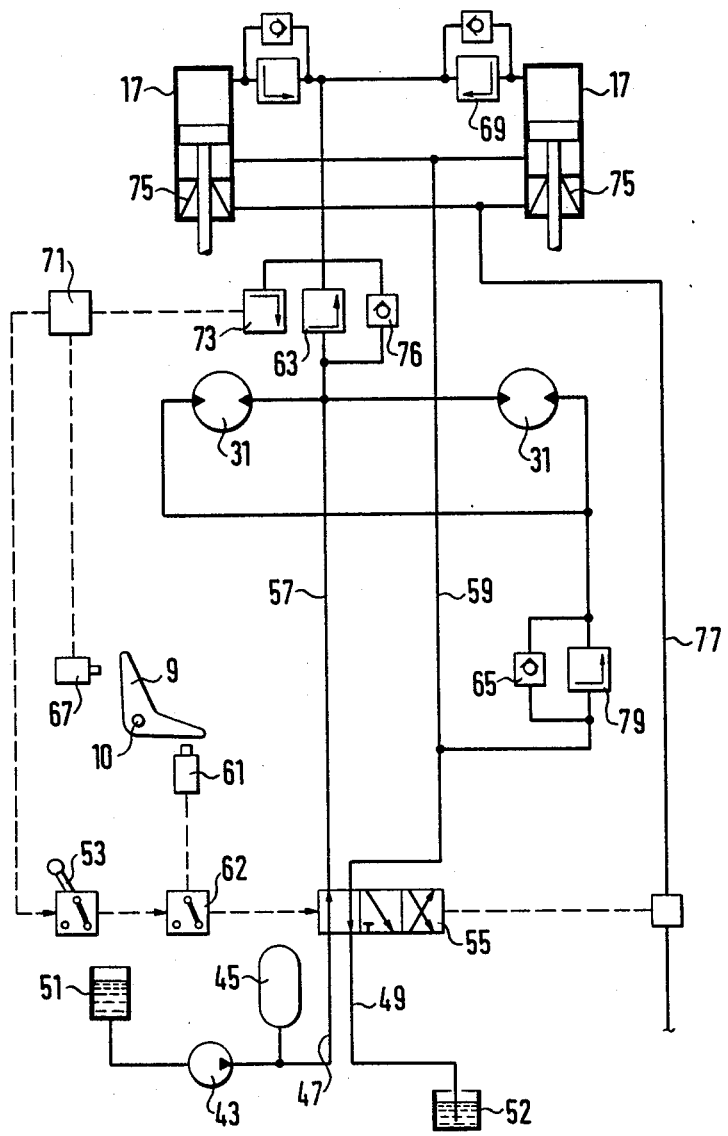
FIG. 5 is a simplified hydraulic circuit diagram which forms part of the lifting mechanism.

The operation of the lifting mechanism of the present invention will be described with reference to the simplified hydraulic circuit diagram of FIG. 5. In FIG. 5, hydraulic lines are indicated by solid lines and electric signal lines, by dashed lines. The hydraulic actuators 17 and the hydraulic motors 31 on both sides of the vehicle frame are only schematically shown. Hydraulic pressure is delivered by a supply system from a reservoir 51, via a pump 43, and, if necessary, a pressure tank 45, into a pressure line 47. A return line 49 leads to a collecting container 52.

Figure 3:
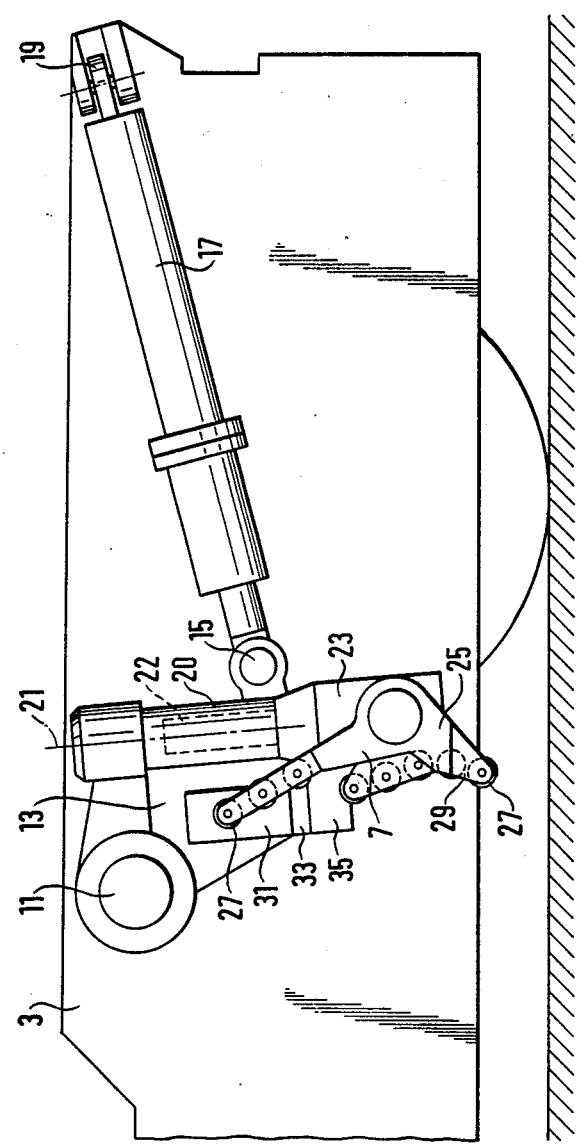
FIG. 3 is a fragmentary, side elevational view, similar to FIG. 2, but shows the lifting mechanism in its operative position.

A valve 55 can be electrically operated by the driver of the vehicle by means of a lever 53 to alternatively connect one of two hydraulic lines 57, 59 with pressure line 47 and return line 49. Valve 55 is shown in the position for moving the lifters 7 from their retracted position 25 (FIG. 4) to their operative positions and for thereafter advancing the lifters in a forward direction by pivoting rocker arms 13 about bearings 11 to thereby puch a nose wheel onto and up ramp 9. The movement of the valve 55 into this position, that is to say, the triggering of the lifting process can be made contingent on the vehicle being maneuvered sufficiently close to the nose-wheel of an aircraft that the nose-wheel makes contact with the tiltably mounted ramp 9 (cf. FIG. 1), in FIG. 5 only schematically shown, and the ramp tilts downward, thereby tripping a limit switch 61 which, via a relay 62, releases the valve 55 for operation. In the position shown, the pressurized hydraulic medium reaches hydraulic motors 31 via hydraulic lines 47 and 57. The motors thereby pivot the associated lifters from their retracted positions, see FIG. 2, into their operative positions, see FIG. 3. During this process, prevailing pressure in line 57 is less than the threshold pressure of a pressure release valve 63 to block the delivery of the pressurized fluid from line 57 to hydraulic actuators 17. During operation spent hydraulic fluid is returned from motors 31 via a check valve 65 to the hydraulic lines 59 and 49.

When hydraulic motors 31 have completed their rotation cycle, that is, when crank arms 33 have reached there respective stop surfaces 39 (FIG. 4), the pressure in the line 57 increases. This causes the pressure activated valve 63 to open, thereby charging the cylinder of hydraulic actuators 17 on the sides opposite from their piston rods. The piston rods are thereby extended to move lifters 7 about horizontal axes 11 in a generally forward direction. In the process, hydraulic fluid flows from the piston rod sides of the actuators 17 into lines 59 and 49. During this movement of the lifter, the nose-wheel of the aircraft is lifted onto the mounting ramp 9. When the nose wheel moves beyond the axis of ramp pivot shaft 10, the ramp tilts forward, thereby tripping another limit switch 67. Its signal is applied to a switching unit 71 to activate a pressure switch 73 which has been set to a specific, predetermined clamping pressure $P_E$. Finally, the nose-wheel reaches a stop surface, with the result that it can no longer advance. The pressure in the hydraulic actuator 17 thereby increases greatly. As soon as pressure $P_E$ has been reached and the pressure switch 73 is activated, the end of the lifting process is signaled by concurrent signals emanating from switches 67 and 73. Switching unit 71 can now issue a variety of commands used elsewhere on the towing vehicle such as, for example, give instructions to activate a nose wheel holder (not shown) and thereby complete the clamping of the nose wheel to the towing vehicle. Hydraulic actuators 17 continue to be charged at the desired clamping pressure $P_E$ reached at the end of the lifting process. This pressure can be retained, for example, by means of a positively controlled check valve 69.

Each of the hydraulic actuators is preferably equipped with a mechanical locking device 75 to clamp the piston rods in their respective extended positions. Such position rod clamping devices are well known in the art and are commercially available. They can, for example, employ disk springs which automatically clamp onto the piston rods in the event they are not positively disengaged as a result of appropriately applying hydraulic pressure. The rod clamping devices are consequently applied as long as they are not kept open by means of an active hydraulic releasing device. During the lifting process, which is initiated by a lever operated by the driver, the rod clamping devices 75 are kept open via a hydraulic pressure line 77. When the nose wheel lifting process has been completed and each lifting cylinder has been charged to the desired clamping pressure $P_E$, the piston rod clamping devices are released so that each piston rod is locked into the set position and the nose-wheel remains tightly clamped to the towing vehicle even if, for example, there is a pressure loss in the hydraulic system.

To release and lower a nose-wheel from the towing vehicle, the above described steps are essentially performed in reverse sequence. By means of lever 53 actuated by the driver, valve 55 is reset so that pressure line 47 is connected to line 59 and the return line 49 is connected to line 57. Hydraulic fluid reaches the rod sides of the pistons of actuators 17 via line 59. The resulting retraction of the piston rods moves lifters 7 rearwardly so that the nose-wheel is lowered by rolling down ramp 9. Hydraulic fluid from the other piston sides flows via a check valve 76 into lines 57 and 49. During this phase, the pressure in line 59 and actuator 17 is lower than the threshold pressure of a pressure activated valve 79 to block delivery of pressurized fluid to the hydraulic motors 31. Thus, during the lowering operation the lifters 7 are locked in their operative positions as a result of the above-described geometry of the crank arm 33 and push bar 35.

When the actuators 17 have completed their return stroke, pressure in line 59 increases such that the pressure activated valve 79 opens, thereby permitting delivery of pressurized fluid to motors 31. The latter rotate and pivot the lifter 7 from their operative positions FIG. 3, into their retracted positions, FIG. 2.

We claim:

1. An aircraft towing vehicle of the type having a vehicle frame constructed to be maneuvered about the surface in forward and aft directions, the frame including a lateral frame member and defining a rearwardly open recess formed to receive an aircraft nose wheel therein, and means at a forward end of the recess for receiving and supporting the nose wheel in a raised towing position, the vehicle comprising:

a lifter for engaging an aft portion of the nose wheel and lifter activating means for moving the nose wheel with the lifter onto the nose wheel supporting means;

the lifter activating means comprising:

rocker means attached to the frame member and adapted to pivot about a generally horizontal axis that is substantially perpendicular to a longitudinal axis of the vehicle;

first drive means operatively coupled with the rocker means for pivoting the rocker means about the horizontal axis in generally forward and aft directions;

lifter support means attached to the lifter and mounted to the rocker means for relative pivotal movement of the lifter support means about a generally upright axis;

second drive means operatively coupled with the rocker means and the lifter support means for pivotally moving the lifter support means and therewith the lifter about the upright axis between a retracted position, in which the lifter is proximate the frame member, and an operative position, in which the lifter is relatively remote from the frame member and in a position so that it can engage the aft portion of a nose wheel disposed in the recess;

whereby activation of the first drive means with the lifter in the operative position engages the lifter with the aft portion of the nose wheel and advances the nose wheel into its towing position;

stop means for preventing the second drive means from pivotally moving the lifter beyond its operative position; and sequencing means operatively coupled with the first and second drive means and responsive to an increase in the force to which the second drive means is subjected when the lifter has reached its operative position for thereafter activating the first drive means to move the rocker means, and therewith the lifter support means and the lifter in a generally forward direction.

2. A towing vehicle according to claim 1 wherein the stop means includes means for mechanically engaging a portion of the second drive means to prevent further movement thereof when the lifter has reached its operative position.

3. A towing vehicle according to claim 1 wherein the first and second drive means are hydraulic driven means, and wherein the sequencing means includes means for sensing an increase in pressure in the fluid driving the second drive means.

4. A towing vehicle according to claim 3 wherein the second drive means comprises a hydraulic motor.

5. A towing vehicle according to claim 4 wherein the first drive means includes a hydraulic actuator having a cylinder and a cooperating piston.

6. A towing vehicle according to claim 4 wherein the second drive means includes a drive linkage having a crank arm mounted to the hydraulic motor for rotation thereby; a swivel arm projecting from the lifter support means; and a push bar having first and second ends pivotally connected to the crank arm and the swivel arm, respectively, the push bar being dimensioned so that an axis thereof interconnecting its pivotal end connections traverses an axis rotation of the hydraulic motor when the lifter is pivotally moved from its retracted position to its operative position so that a mechanical over-center lock is established when the stop means prevents further movement of the lifter beyond its operative position.

7. A towing vehicle according to claim 6 wherein stop means includes a stationary stop surface, and wherein the crank arm is shaped to engage the stop surface when the lifter arrives at its operative position.

8. A towing vehicle according to claim 1 wherein the frame includes two laterally spaced apart frame members, a lifter associated with each frame members, and a lifter activating means for each lifter.

* * * * *